(12) United States Patent
Stehle

(10) Patent No.: US 8,245,737 B2
(45) Date of Patent: Aug. 21, 2012

(54) FILLING SYSTEM FOR SEALING AND INFLATING TIRES

(76) Inventor: Michael Stehle, Uberlingen (DE)

( * ) Notice: Subject to any disclaimer, the term of this patent is extended or adjusted under 35 U.S.C. 154(b) by 749 days.

(21) Appl. No.: 12/084,221

(22) PCT Filed: Jun. 20, 2006

(86) PCT No.: PCT/EP2006/005898
§ 371 (c)(1),
(2), (4) Date: Mar. 10, 2009

(87) PCT Pub. No.: WO2007/048453
PCT Pub. Date: May 3, 2007

(65) Prior Publication Data
US 2009/0218005 A1 Sep. 3, 2009

(30) Foreign Application Priority Data
Oct. 28, 2005 (DE) .................... 20 2005 017 071 U

(51) Int. Cl.
*B65B 31/00* (2006.01)

(52) U.S. Cl. ............ 141/38; 141/114; 141/313; 156/97

(58) Field of Classification Search .................... 141/38, 141/94, 100, 104, 114, 251, 313, 351; 152/502; 156/115, 97; 137/227
See application file for complete search history.

(56) References Cited

U.S. PATENT DOCUMENTS

| | | | |
|---|---|---|---|
| 6,283,172 B1 | 9/2001 | Thurner | |
| 6,293,762 B1 | 9/2001 | Farkhan | |
| 6,889,723 B2 * | 5/2005 | Gerresheim et al. | ............ 141/38 |
| 7,789,110 B2 * | 9/2010 | Marini | .............. 141/38 |
| 2002/0121331 A1 | 9/2002 | Gerresheim | |
| 2003/0056851 A1 | 3/2003 | Eriksen | |
| 2005/0056358 A1 | 3/2005 | Eriksen | |

FOREIGN PATENT DOCUMENTS

| | | |
|---|---|---|
| DE | 199 48 706 | 7/2000 |
| DE | 10 2004 048002 | 9/2001 |
| DE | 10 2004 042911 | 3/2006 |
| FR | 2 753 653 | 3/1998 |
| WO | WO 2005/084968 | 9/2005 |

* cited by examiner

*Primary Examiner* — Gregory Huson
*Assistant Examiner* — Jason Niesz
(74) *Attorney, Agent, or Firm* — Lambert & Associates; Gary E. Lambert; David J. Connaughton, Jr.

(57) ABSTRACT

In a filling system for sealing and inflating tires, comprising at least one pressure source, in particular a compressor, and at least one container for receiving tire sealant, the container for receiving tire sealant is to be of tire-like design.

17 Claims, 5 Drawing Sheets

FILLING SYSTEM FOR SEALING AND INFLATING TIRES

CROSS REFERENCE TO RELATED APPLICATION

This application is for entry into the U.S. National Phase under §371 for International Application No. PCT/EP2006/005898 having an international filing date of Jun. 20, 2006, and from which priority is claimed under all applicable sections of Title 35 of the United States Code including, but not limited to, Sections 120, 363 and 365(c), and which in turn claims priority under 35 USC 119 to German Patent Application No. 20 2005 017 071.2 filed on Oct. 28, 2005.

BACKGROUND OF THE INVENTION

The present invention relates to a filling system for sealing and inflating tires having at least one pressure source, in particular a compressor and at least one container for receiving tire sealants.

Such types of filling systems are known and available in the market in many shapes and embodiments. They serve to accommodate tire sealants in defective tires when there is a flat tire and to seal a defective tire. In the process, using a compressor, compressed air is pressed into a bottle with tire sealant, and through appropriate standpipes, the tire sealant is then pumped through the valve into the defective tires.

The disadvantage in such conventional tire systems is that these must be separately designed and aligned for each type of vehicle, are difficult to operate, [and] not easy to handle during a puncture, with tire sealants often coming out and dirtying the user. Conventional systems are not to be used on diagonally inclined surfaces and must be renewed or replaced after use at great cost by the repair shop or the specialized company.

The task of the present invention therefore is to create a filling system of the aforementioned type, which eliminates the disadvantages mentioned and with which an easy to use filling system is created in a simple and inexpensive manner, which is universally employable or usable, and moreover considerably facilitates the operability for the user as well as replacement after subsequent use.

SUMMARY OF THE INVENTION

The features of claim 1 as well as those of the independent claims result in achieving this task.

In the present invention, it has in particular proven advantageous to design a casing in a cylindrical and disk-like manner, in which the essential components, such as the pressure source, in particular the source of compressed air and compressor are accommodated, which can be provided by an external source of energy or rechargeable with energy. In the casing itself, appropriate switches, valve change-over switches, manometers or the like, as well as appropriate accommodation spaces, annuli for accommodating the electrical connecting lines or the compressed air feeding pipe, are created. Here, a compressed air feeding pipe in the shell-side region may be inserted or fastened in a recess, preferably in between [sic] the container connected thereto to accommodate the tire sealant.

Following the cross-sectionally round and cylindrically designed casing for accommodating the compressor, a container, likewise correspondingly cylindrical and preferably round, is connected to accommodate the tire sealant. This is preferably designed tire-like. This container for accommodating the tire sealant is connectable, snap-in, screwable or the like, with a face of the casing to accommodate the compressor. Here, projecting parts or recesses that are correspondingly designed socket-like can be provided between the container and the face of the casing in order to screw down or connect the container in a detachable manner with the casing of the compressor.

What is important in the present invention is for the casing and container for accommodating the tire sealant to be cross-sectionally equal, preferably round, and to have approximately the same dimension or diameter. In this way, a compact, flat unit is built, which can be easily stowed away or kept in trunks, spare wheel cavities, inner spaces of spare tire wheel rims, etc.

Here, one and the same casing may be used with the compressor inserted, etc., for containers with varying heights or thicknesses to accommodate tire sealants. For use on motorbikes or bicycles, stocking up a small volume of tire sealant will suffice so that, although this exhibits approximately the same diameter as the casing of the compressor, it is not high and/or not as thick. Should correspondingly greater quantities of tire sealants be stocked up for, for example, motor vehicles, a greater height of the container may be selected accordingly to accommodate the tire sealant while the diameter remains the same.

For even bigger tires that require even greater quantities of tire sealants during a flat tire, such as truck tires or tractor tires, an even greater height or thickness of the container may be selected to accommodate the tire sealant while the diameter remains the same in order to stock up greater quantities of tire sealant there. In the process, irrespective of the different height of the tire sealant, the container may always be connected to the casing of the compressor in a detachable manner, while the construction of the compressor does not change.

A withdrawal device on the face is likewise allocated to the container to accommodate the tire sealant, with a compressed air feeding pipe being connected to the withdrawal device in order to introduce compressed air thereto, whereby the tire sealant can then be applied into the tires via the withdrawal feeding line that empties into the container via standpipes or the like.

After using the filling system, only the container with the withdrawal device is replaced. The user can do this himself without requiring any corresponding workshop or technical personnel. He can simply purchase the container with the withdrawal device with the desired quantity of tire sealant again from the accessories retailer and screw this onto the existing casing of the compressor.

Within the scope of the present invention, the casing and/or the container for accommodating the tire sealant should each be designed tire-like as well, in which either the casing of the compressor or the container for the tire sealant can be suitable for placing on a surface. The present invention is [sic] not limited thereto.

BRIEF DESCRIPTION OF THE DRAWINGS

Other advantages, features and particulars of the present invention arise from the following description of preferred exemplary embodiments as well as using the drawing; this shows in.

DETAILED DESCRIPTION OF THE PREFERRED EMBODIMENT

Figure 1:
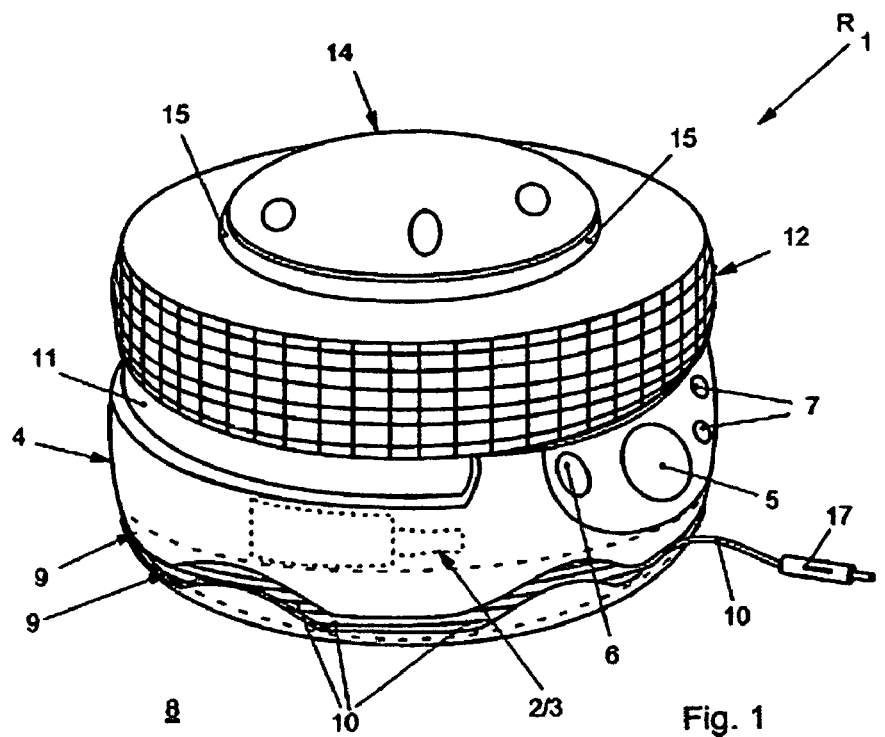
FIG. 1, a schematically illustrated perspective view of a filling system for sealing and pumping tires.
Figure 2:
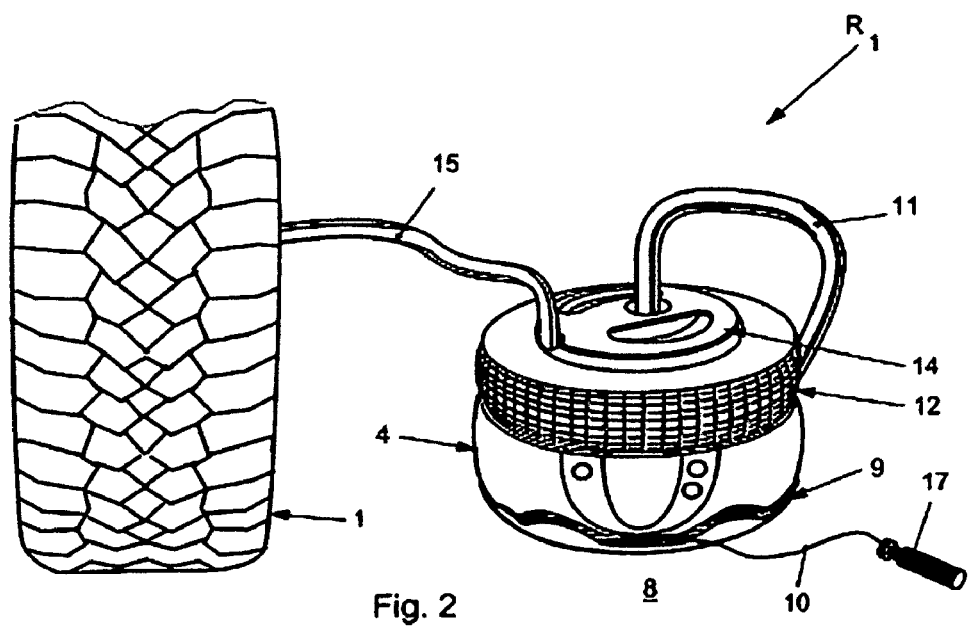
FIG. 2, a schematically illustrated perspective view of the filling system in accordance with FIG. 1 in a position of use.

In accordance with FIG. 1, a filling system $R_1$ for sealing and pumping tires 1, see FIG. 2, exhibits pressure source 2, in particular compressor 3, which produces compressed air. Other pressure sources 2, such as compressed gas or air containers, may also be suggested here.

Here, pressure source 2, in particular compressor 3, is arranged in a casing 4, in which manometer 5, on the casing side, and switch 6 as well as change-over switch 7 are also provided.

The casing 4 is preferably cylindrically designed and stands on surface 8 to accommodate pressure source 2, in particular compressor 3.

Aside from its outer casing surface, a ring region 9 is inserted, which serves to accommodate electrical supply line 10.

The compressor is directly or indirectly connected with the manometer 5 or with a compressed air feeding pipe 11.

It has in particular proven advantageous in the present invention to mount on the face a container 12 to accommodate tire sealant 13, see FIG. 2, on the casing 4 with integrated compressor 3.

Here, container 12 is cross-sectionally round and cylindrical, preferably designed tire-like to accommodate tire sealant 13.

It is preferred for the diameters of casing 4 and container 12 to be of approximately equal size to accommodate tire sealant 13.

Figure 3:
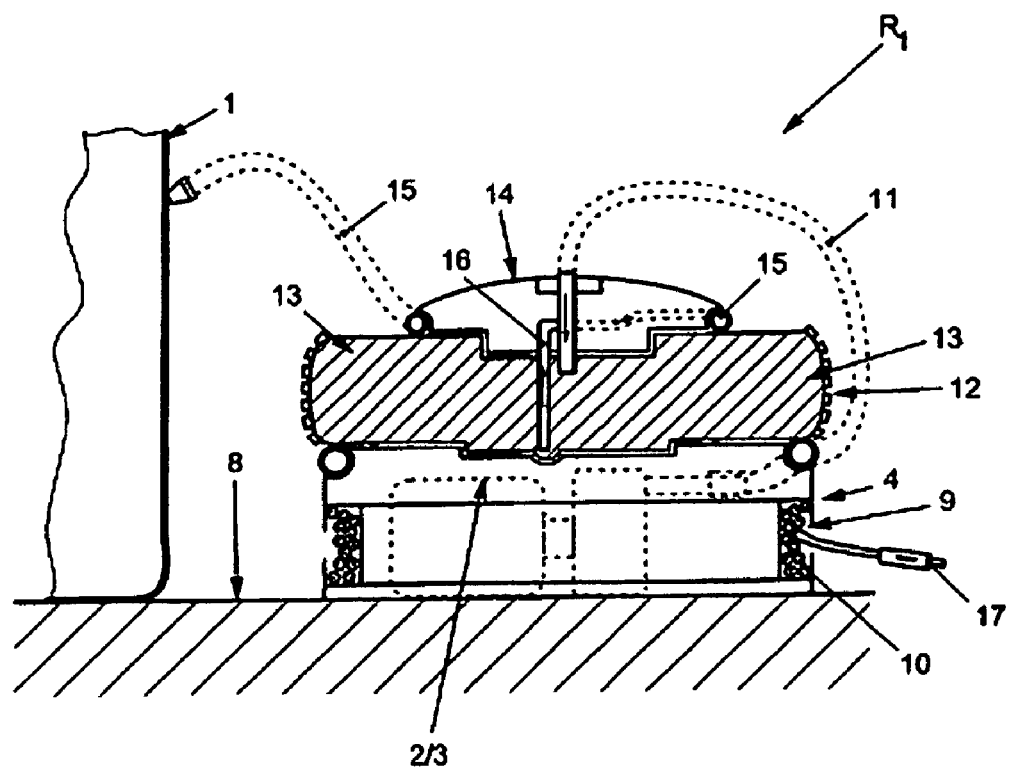
FIG. 3, a schematically illustrated longitudinal section through the filling system in accordance with FIG. 1.

In the process, container 12, as indicated in the cross-sectional illustration in accordance with FIG. 3, may be firmly and detachably connected to casing 4, in particular screwed on.

In addition, preferably in the center of container 12, a withdrawal device 14 must be allocated, which can be connected at one end via a withdrawal feeding pipe 15 to tires 1, and on the other end, catches into container 12 via a rigid or flexible standpipe 16 in order to take out tire sealant 13 from there.

Valves, etc., that are not illustrated, regulate a clean closing in the non-operative condition or an opening in the position of application. No further detail will be given in this regard.

The important thing in the present invention is for the container 12 to be designed somewhat tire-like on its exterior and to be exhibiting approximately the same diameter as casing 4 for accommodating compressor 3 with an integrated or inserted manometer 5, if necessary, switch 6 and change-over 7, as well as electronic supply pipes 12 with connector element 17 for connecting to any power source. Through the disk-like and cylindrical style of casing 4 with a compressor inserted and through the correspondingly tire-like designed shape of container 12 for accommodating the tire sealant, a compact unit is created as a filling system $R_1$, which has a rigid state on surface 8, and which does not fall even if surfaces 8 are inclined, and can be accommodated in a very space-saving manner, for example in correspondingly rounded cavities in the trunk of the vehicle or even within the rim of a spare tire.

Moreover, handling this filling system designed as a unit is considerably easier because not only the stability but the replacement as well of container 12 from casing 4 of compressor 3 is very easily done by, for example, twisting via the corresponding thread that intermesh, and replacing after use.

Figure 4A:
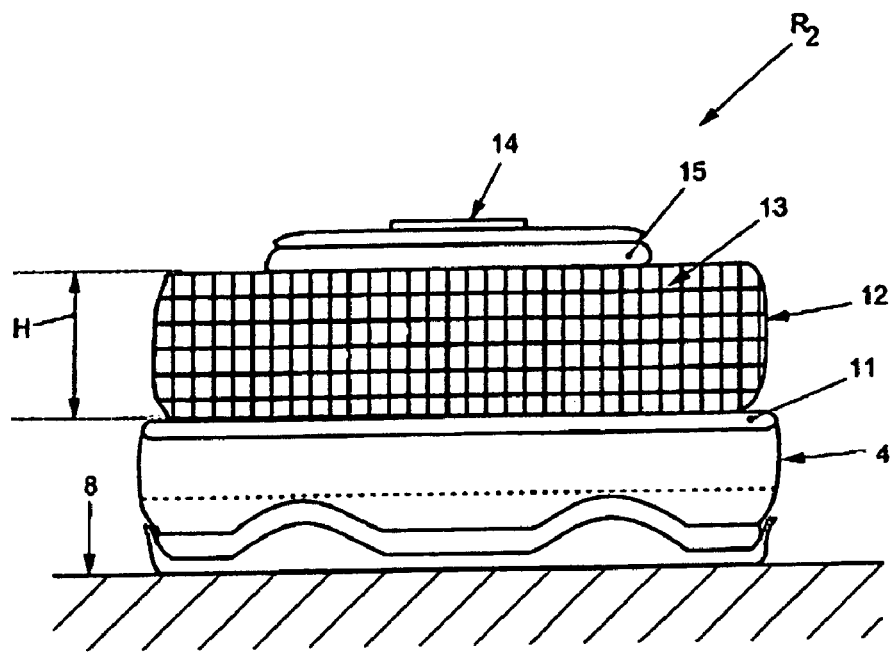
FIG. 4a, a schematically illustrated top view of another filling system in accordance with FIG. 1.
Figure 4B:
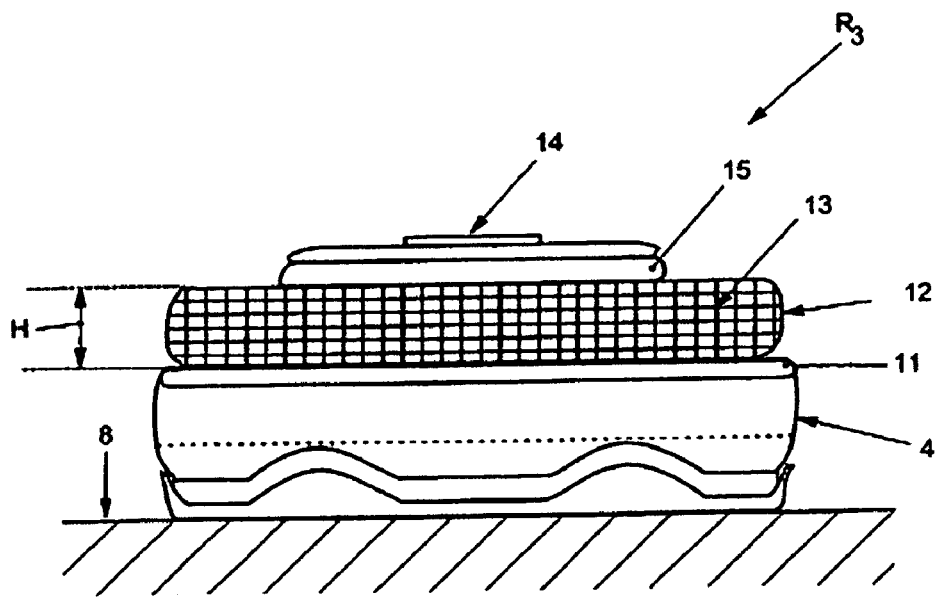
FIG. 4b, a schematically illustrated top view of another filling system in accordance with FIG. 1, having a container small in design to accommodate the tire sealant.
Figure 4C:
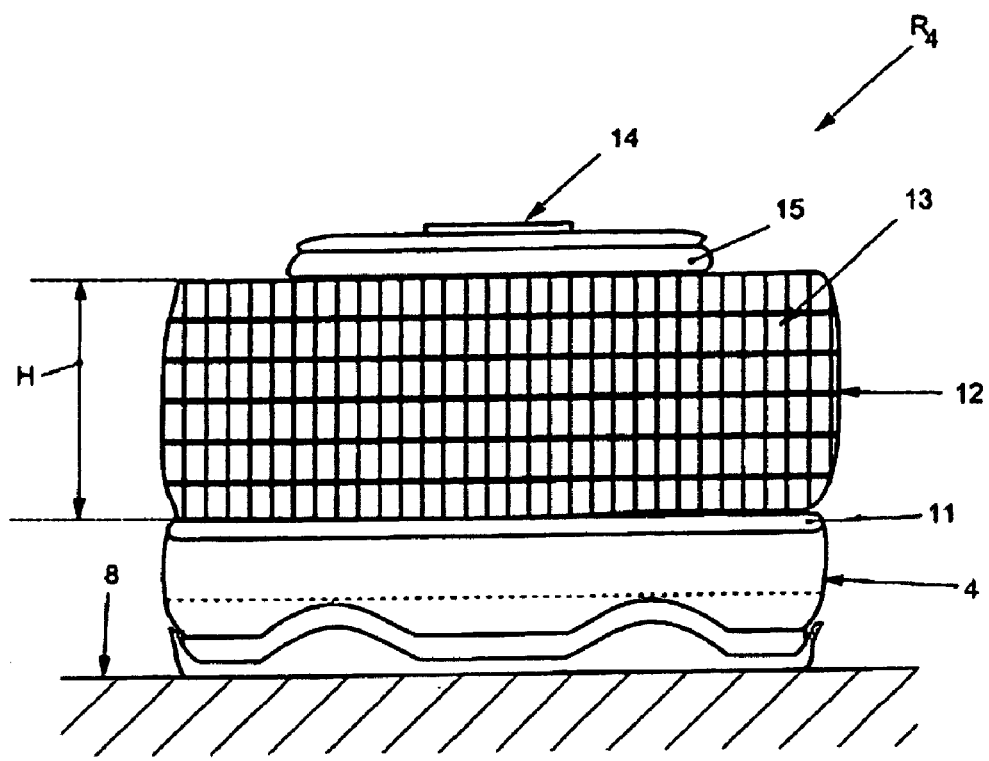
FIG. 4c is a top view of another exemplary embodiment of the filling system in accordance with FIG. 1.

Moreover, it has proven advantageous in the present invention that only one and the same casing 4 can be used with the compressor 3 inserted in order to create containers 12 of different sizes to accommodate different quantities of tire sealant as illustrated in FIGS. 4a, 4b, and 4c.

The casing 4 preferably exhibits a uniform height and a uniform diameter.

In order to stock up different volumes for different purposes of application for tire sealant 13, it has proven advantageous in the present invention to select different containers 12 with different heights H in order to stock up different volumes of tire sealant 13.

Container 12 for accommodating the tire sealant 13 in accordance with FIG. 4a is of a defined height H to the casing 4, while the diameter remains the same, in order to accommodate a defined quantity of tire sealant.

This filling system $R_2$ serves to accommodate tire sealant 13 for private vehicles, for example.

In the exemplary embodiment in accordance with FIG. 4b, a filling system $R_3$ of the above-mentioned type is described, which exhibits a smaller container 12, which likewise approximately has the same diameter as the casing 4 for accommodating compressor 3. There is correspondingly less tire sealant 13 stocked up in the present container 12, which is likewise designed tire-like, and can find application for bicycles or motorcycles, for instance.

A container 12 of a great height H in accordance with FIG. 4c of a filling system $R_4$ is shown for tractors and tractors, the filling system stocking up a considerably greater quantity of tire sealant 13.

In this way, the entire diameter of the filling system $R_1$ to $R_4$ is not changed or constantly maintained and only through different heights H of the container 12 is there control over the quantity of tire sealant 13 to be stocked up.

Figure 4D:
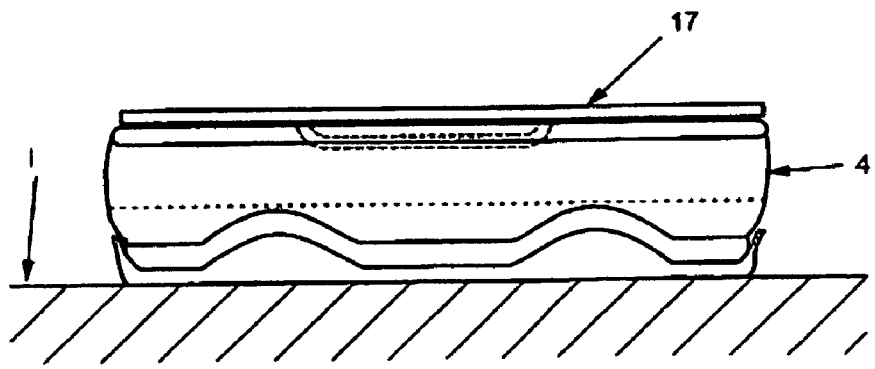
FIG. 4d is a schematically illustrated top view of the cylindrically designed casing of the compressor with a lid element.

In the exemplary embodiment of the present invention in accordance with FIG. 4d, casing 4 can be used with integrated compressor 3 also as a "stand-alone" embodiment in order to pump tires, air mattresses, inflatable boats or the like, etc. Here, a lid element 17 may be provided in order to ensure a clean floor space or covering of casing 4 of compressor 3.

Figure 5A:
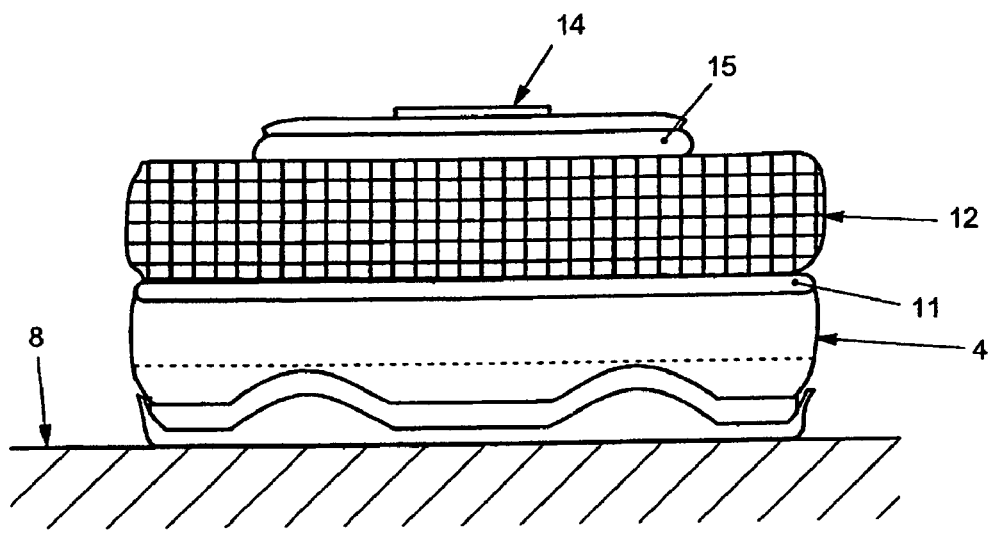
FIGS. 5a and 5b are schematically illustrated top views of two different mounting options of the filling system on a surface.
Figure 5B:
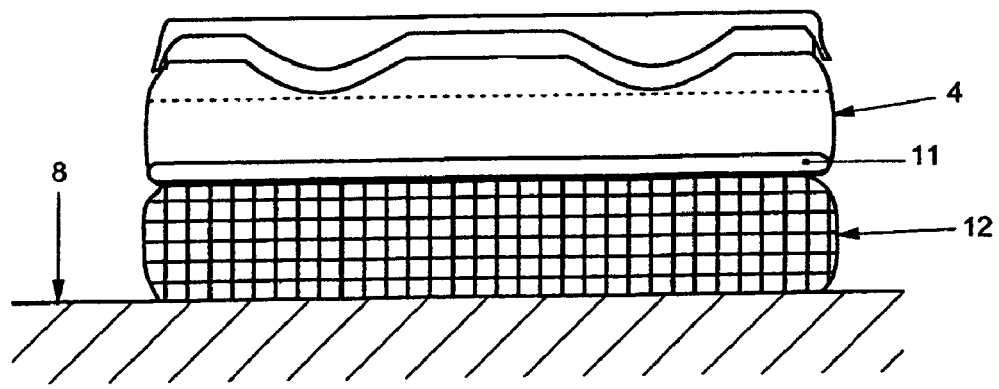

In the exemplary embodiment in accordance with FIGS. 5a and 5b, it should only be indicated that not only can the casing 4 be set on surface 8, but as FIG. 5b indicates, container 12 can be supported directly on surface 8 and above it, corresponding to the above-described manner, casing 4 connects to accommodate compressor 3, etc. This should also lie within the scope of the present invention.

| Designation list | |
|---|---|
| 1 | Tires |
| 2 | Pressure source |
| 3 | Compressor |

| Designation list | |
|---|---|
| 4 | Casing |
| 5 | Manometer |
| 6 | Switch |
| 7 | Change-over switch |
| 8 | Surface |
| 9 | Annulus |
| 10 | Electr. connecting line |
| 11 | Compressed air feeding pipe |
| 12 | Container |
| 13 | Tire sealant |
| 14 | Withdrawal device |
| 15 | Withdrawal feeding pipe |
| 16 | Standpipe |
| 17 | Lid |
| $R_1$ | Filling system |
| $R_2$ | Filling system |
| $R_3$ | Filling system |
| $R_4$ | Filling system |
| H | Height |

The invention claimed is:

1. A filling system for sealing and pumping tires comprising:
a casing, having a face, wherein the casing encapsulates a pressure source; and
a container, wherein the container includes a plurality of tire sealant for introduction into a tire, and wherein the container is removably attachable to the face of the casing the face being on a top surface of the container;
wherein the pressure source is an air compressor locatable within the casing, thereby enabling delivery of tire sealant to a tire during use of the system;
the casing being cylindrical in shape and having a circular cross-section, and the container being cylindrical in shape and having a circular cross-section, the diameter of the cross section of the casing and the diameter of the cross section of the container being substantially equal;
an outer perimeter of the casing being aligned with an outer perimeter of the container when attached to the face.

2. The filling system of claim 1, wherein the casing and container form a wheel shape when attached together.

3. The filling system of claim 2, wherein the wheel shaped casing and container are sized to fit within a spare wheel cavity.

4. The filling system of claim 1, wherein the system is utilized for sealing and inflating tires on vehicles selected from the group consisting of bicycles, two-wheelers, motor vehicles and trucks.

5. The filling system of claim 1, wherein the system is disposed to retain containers possessing varying volumetric amounts of tire sealant to accommodate the different amounts of tire sealant required to seal and inflate different sizes of tires.

6. The filling system of claim 1, wherein the casing is utilized as a stand-alone device possessing the ability to inflate objects, and wherein the casing is utilized as a stand-alone device, a lid is attachable to the face of the casing to provide a covering for the casing.

7. The filling system of claim 1, wherein an annular member encapsulates the casing, such that the annular member accommodates an electrical connecting line which communicates with a connector element for supplying power to the pressure source.

8. The filling system of claim 1, wherein the casing of the system further comprises a manometer, wherein the manometer is attachable to casing to measure the amount of pressure.

9. The filling system of claim 1, wherein a compressed air feeding pipe is connectable to the pressure source, and extendable into the container, thereby delivering compressed air into the tire sealant.

10. The filling system of claim 1, wherein a withdrawal device is removeably attachable to the container, and wherein the withdrawal device further comprises:
a withdrawal feeding pipe connectable to the withdrawal device, wherein the feeding pipe delivers tire sealant and compressed air from the pressure source to a tire; and
a standpipe, wherein the standpipe is locatable within the container and connectable to the withdrawal feeding pipe, thereby enabling tire sealant to move from the container through the withdrawal feeding pipe to a tire.

11. The filling system of claim 1, wherein the casing further includes a switch and a changeover switch.

12. The filling system of claim 1, wherein the casing includes a rigid surface, thereby preventing movement on any type of inclined surface during operation.

13. The filling system of claim 1, wherein the container is removeably attachable to the casing by a variety of attachment means selected from the group consisting of snap-in and screw-on.

14. The filling system of claim 9, wherein the compressed air feeding pipe is locatable between the container and the casing.

15. The filling system of claim 10, wherein a recess is formed between the withdrawal device and the container to accommodate the tire sealant radially.

16. The filling system of claim 7, wherein the annular member includes web elements of varying lengths that project and extend upwardly and downwardly along the casing to allow for storage of the electrical connecting line.

17. A filling system for sealing and pumping tires comprising:
   a casing, having a face, wherein the casing encapsulates a pressure source; and
   a container, wherein the container includes a plurality of tire sealant for introduction into a tire, and wherein the container is removably attachable to the face of the casing the face being on a bottom surface of the container;
   wherein the pressure source is an air compressor locatable within the casing, thereby enabling delivery of tire sealant to a tire during use of the system;
   the casing being cylindrical in shape and having a circular cross-section, and the container being cylindrical in shape and having a circular cross-section, the diameter of the cross section of the casing and the diameter of the cross section of the container being substantially equal;
   an outer perimeter of the casing being aligned with an outer perimeter of the container when attached to the face.

* * * * *